Patented Dec. 18, 1951

2,578,913

UNITED STATES PATENT OFFICE 2,578,913

FLUORINATION OF HYDROCARBONS

Gerald M. Whitman, Wilmington, Del., assignor to E. I. du Pont de Nemours & Company, Wilmington, Del., a corporation of Delaware No Drawing. Application November 2, 1949, Serial No. 125,171

8 Claims. (Cl. 260—653)

This invention relates to a new process for the preparation of fluorinated hydrocarbons.

This application is a continuation-in-part of my application Serial No. 108,041, filed August 1, 1949, now abandoned.

The conventional method for preparing fluorinated hydrocarbons consists in reacting a chlorinated or brominated hydrocarbon with a fluorinating agent, such as antimony trifluoride or hydrogen fluoride, whereby the halogen present in the hydrocarbon is replaced by fluorine. This has the disadvantage of being an indirect process. Elementary fluorine has been used to a limited extent for the direct fluorination of hydrocarbons but has the disadvantage that the reaction is difficult to control.

This invention has as an object a new method for obtaining fluorinated hydrocarbons. A further object is a process for preparing fluorinated hydrocarbons by direct reaction of a hydrocarbon with a fluorinating agent. A further object is a new method for preparing vinyl fluoride and ethyl fluoride, and particularly the former, by oxidative fluorination of ethane. Other objects will appear hereinafter.

In accordance with the present invention the above objects are accomplished by heating a mixture of a paraffin hydrocarbon, hydrogen fluoride, and oxygen to reaction temperature, within the range 325–700° C., in the presence of a salt or oxide of a variable valent metal as a catalyst.

A convenient method for carrying out the process consists in passing a gaseous mixture of the hydrocarbon, hydrogen fluoride and oxygen through a heated Inconel tube containing a bed of the catalyst. For best results a small amount of hydrogen bromide or other "promoter" is added to the gaseous charge. After passing through the reaction tube, the reaction mixture is separated into its components, for example, by condensing the off-gas and then subjecting it to fractional distillation. In general a mixture of fluoro-substituted hydrocarbons is obtained.

The process is illustrated more fully in the following examples.

Example I

A mixture of 20% methane, 40% hydrogen fluoride, 30% oxygen, and 10% hydrogen bromide (all on a volume basis) was passed at a rate of 10 liters/hour through an Inconel tube, which was of 30 in. length and of 1 in. internal diameter and which contained 140 cc. of copper oxide on alpha-alumina as catalyst, heated to 488° C. The contact time of the gaseous mixture with the heated catalyst under these conditions was approximately 18 seconds. The off-gas, i. e., the gaseous mixture coming from the reaction tube, was condensed in a series of cold traps maintained at −195° C. After five hours' operation, 10 cc. of condensate was collected in the traps. This condensate was distilled in a low-temperature Podbielniak still with the following results:

| Boiling Point | Composition | Mole Per Cent of Total Gas Distilled |
|---|---|---|
| −195° C | $N_2$ | 84.6 |
| −162° C | $CH_4$ | 7.2 |
| −83° C | $CHF_3$ | 2.5 |
| −78° | $CH_2F_2$ | Trace |
| −66° C | Not identified | 1.7 |
| −52° C | $CH_3F$ | 1.1 |
| +4° C | $CH_3Br$ | 2.0 |
| +24° C | $CBrF_3$ | 0.9 |

The fluorine-containing hydrocarbons were identified by boiling point and infrared absorption.

The catalyst used in this example was prepared by soaking 500 parts by weight of alpha-alumina in a solution of 150 parts by weight of cupric nitrate dissolved in 65 parts by weight of water. This mixture was heated for 2 hours at 500° C. in a stream of oxygen prior to use.

Example II

A mixture of 16% methane, 52% hydrogen fluoride, 24% oxygen, and 8% hydrogen bromide (on volume basis) was passed at a rate of 12.6 liters/hour through a catalyst-filled tube identical with that used in Example I. The temperature of the tube was 520° C. and the contact time approximately 14 seconds. The product (off-gas) was collected in a cold trap maintained at −128° C. After 13 hours' operation, the 20 cc. of condensate collected in the trap was distilled as in Example I with the following results:

| Boiling Point | Composition | Mole Per Cent of Total Gas Distilled |
|---|---|---|
| −83° C | $CHF_3$ | 18.8 |
| −78° C | $CH_3F$ | 4.5 |
| −66° C | Not identified | 12.0 |
| −52° C | $CH_2F_2$ | 6.4 |
| −18° C | $CHBrF_2$ | 1.7 |
| −10° C | Not identified | 1.2 |
| +4° C | $CH_3Br$ | 24.9 |
| +8° C | Not identified | 4.4 |
| +14° C | do | 3.3 |
| +24° C | $CBr_2F_2$ | 22.8 |

Example III

This example was carried out under substantially the same conditions as Example I except that the reaction tube was heated to 550° C. and the catalyst was obtained by soaking 300 parts by weight of alpha-alumina in a solution of 125 parts by weight of chromic nitrate in 60 parts by weight of water and heating the impregnated alumina at 500° C. for one hour in a stream of oxygen prior to use. The product off-gas contained 4% trifluoromethane and 0.6% difluoromethane according to infrared analysis.

*Example IV*

A mixture of 33.3% methane, 44.5% hydrogen fluoride, and 22.2% oxygen (on volume basis) was passed at a rate of 9 liters per hour through an Inconel tube identical with that described in Example I but containing 140 cc. catalyst prepared by soaking 480 parts by weight of alpha-alumina in a solution of 90 parts by weight of cupric nitrate and 10 parts by weight of lead nitrate in 80 parts by weight of water. The temperature of the tube was 542° C. and contact time approximately 18 seconds. Analysis of the off-gas by infrared showed about 1% each of trifluoromethane and difluoromethane, with trace of monofluoromethane.

*Example V*

A mixture of 28% ethane, 29% hydrogen fluoride, 41% oxygen, and 2% hydrogen bromide (percentages in terms of volume) was passed at a rate of 44 liters/hour through an Inconel tube, which was 30 in. long and 2 in. in internal diameter and which contained 650 cc. of copper oxide on alpha-alumina, heated to 550° C. The contact time of the gaseous mixture with the heated catalyst was about 20 seconds. The off-gas was passed through dry sodium fluoride to absorb unreacted hydrogen fluoride, then through soda lime to absorb carbon dioxide, next through Drierite (calcium sulfate) to remove water, and finally into two traps, the first cooled to −78° C. and the second to −195° C. After 2 hours operation, about 1 cc. of liquid (apparently vinyl bromide) collected in the −78° C. trap and about 25 cc. of solid in the −195° C. trap. The solid product, on distillation in a Podbielniak still, was found to consist of: 63% of a mixture of methane and carbon monoxide; 16% of a fraction boiling at −110° C. and consisting largely of ethylene but containing small amounts of methane and trifluoromethane; and 18% of a mixture boiling at −98 to −42° C., mostly at −98 to −94° C., consisting of ethane, trifluoromethane, and traces of difluoromethane and monofluoromethane (identified by infrared analysis).

*Example VI*

A mixture of 21.8% methane, 43.5% hydrogen fluoride, 32.7% oxygen, and 2% hydrogen bromide (by volume) was passed at a rate of 20 liters per hour through an Inconel tube of 1.5 inch diameter and 30 inch length containing 340 cc. of the copper nitrate on the alumina catalyst described in Example I. The product off-gas contained 10% trifluoromethane and 6.5% difluoromethane with an indeterminate amount of monofluoromethane based on infrared analysis. This corresponds to a 23.8% yield of fluoromethanes based on the methane consumed, or a 25.5% yield based on the hydrogen fluoride.

*Example VII*

A catalyst was prepared by soaking 350 cc. (617 g.) of alpha-alumina in a solution of 300 g. $Fe(NO_3)_3 \cdot 9H_2O$ in 130 cc. of water. This mixture was placed in an Inconel tube, 30 inches in length and 1½ inches internal diameter, and heated in oxygen at 500° C. for two hours and then in hydrogen fluoride for ½ hour. A mixture of 20% ethane, 40% hydrogen fluoride, 30% oxygen, and 10% hydrogen bromide (all on a volume basis) was then passed over the catalyst at a rate of 21 liters/hour and at a temperature of 410° C. The offgas was passed through sodium fluoride (to remove hydrogen fluoride), "Drierite," sample bulbs and a cold trap maintained at −78° C. Infrared analysis of the offgas showed the presence of from 1–5% of vinyl fluoride and a small amount of dibromodifluoromethane. Infrared analysis of the liquid condensed in the trap indicated the presence of vinyl bromide, dibromodifluoromethane, and methyl bromide. The yield of vinyl fluoride based on ethane was 6.2%.

*Example VIII*

A catalyst was prepared by soaking 350 cc. (617 g.) of alpha-alumina in a solution of 200 g. of lead nitrate in 250 cc. of water. A mixture of 30% ethane, 40% hydrogen fluoride, 20% oxygen and 10% hydrogen bromide was passed over this catalyst in the reactor described in Example VII at a temperature of 353° C. and at a flow rate of 21 liters/hour. Infrared analysis of the offgas showed the presence of 5% by volume of ethyl fluoride, and the condensate in the Dry Ice trap contained ethyl fluoride, vinyl bromide, and methyl bromide. The yield of ethyl fluoride was about 13% based on consumed ethane.

*Example IX*

Three hundred and fifty cc. (436 g.) of cupric fluoride dihydrate was placed in the reactor described in Example VIII and heated at 100° C. in a stream of hydrogen fluoride until free from water. A mixture of 31.5% ethane, 37% hydrogen fluoride, 21% oxygen, and 10.5% hydrogen bromide was then passed over this catalyst at a temperature of 348° C. and flow rate of 19 liters/hour. Infrared analysis showed the offgas to contain about 5% of ethyl fluoride.

When this example was repeated exactly, except that the temperature was increased to 471° C., infrared analysis disclosed the presence of 1–5% vinyl fluoride in the offgas together with some methyl fluoride, methylene fluoride, and fluoroform.

*Example X*

Example VIII was repeated, except that 350 cc. of cupric fluoride dihydrate was used as catalyst and the temperature was 500° C. The offgas obtained in this manner was found by infrared analysis to contain 5–10% of vinyl fluoride, and the Dry Ice trap contained some ethyl fluoride. The yield of vinyl fluoride in this experiment was about 15% calculated on ethane consumed.

*Example XI*

Example VIII was repeated with a catalyst prepared by soaking 350 cc. (617 g.) of alpha-alumina in a solution of 200 g. of chromic nitrate in 250 cc. of water. The reaction temperature was 457° C. and the flow rate 21 liters/hour. Infrared analysis showed the offgas to contain some ethyl fluoride.

The process of this invention is applied most advantageously to the gaseous paraffin hydrocarbons, particularly those containing from 1 to 5 carbon atoms, both because of ease of operation and because they yield fewer by-products. Examples of such hydrocarbons, in addition to those already mentioned, are propane, butane, isobutane and pentane. Examples of higher hydrocarbons, namely, those containing up to 20 carbon atoms, that may be used are hexane, decane, cetane and eicosane. Mixtures of hydrocarbons may also be used.

The molar or volume ratio of oxygen to paraffin hydrocarbon can be varied widely but is preferably kept within the range 1:3 to 3:1. The molar ratio of oxygen to hydrogen fluoride can likewise be varied considerably. In general, however, this ratio should be kept between 1:5 and 2:1.

In Examples I–III, V, and VI–XI, hydrogen bromide was included in the reaction mixture as a "promoter." The mechanism by which this agent functions is not known, but its use greatly increases the yield of fluorohydrocarbon. Hydrogen chloride and iodide can also be used as promoters. When hydrogen bromide, chloride, or iodide is used as promoter, some bromo-, chloro-, or iodo-substituted hydrocarbons are obtained. The molar ratio of oxygen: promoter should preferably exceed 1:1 and is advantageously in the range 2:1 to 20:1.

Catalysts useful to this process are oxides and inorganic salts of variable valent metals, such as copper, lead, chromium, and the metals ranging in atomic number from 26 to 28 and constituting the group iron, cobalt and nickel. These catalysts are preferably made by treating a suitable support, such as alumina, calcium fluoride, or copper gauze, with an aqueous solution of an inorganic acid salt of the multi-valent metal, for example, the nitrate, sulfate, chloride, or other halide, and then heating to remove the water. At reaction temperatures the salt may be converted to the oxide or fluoride. The preferred catalysts are prepared from copper salts, such as cupric nitrate, cupric sulfate and cuprous chloride. Metal chromites, particularly copper chromite, are also effective catalysts.

Owing to the high temperatures used in the fluorination process of this invention (325 to 700° and preferably 450–575° C.), the reaction mixture is kept in the reaction zone for only a short time. Contact periods ranging from 5 to 60 seconds are normally used. Even under these conditions little monofluoromethane is found in the product, presumably because of its thermal instability. The principal fluorinated products obtained from methane are difluoromethane and trifluoromethane. When hydrocarbons higher than methane are used, some decomposition occurs particularly at the higher temperatures, for fluoromethanes are present in the products.

As indicated in the examples, the temperature and the catalyst have a marked effect on the course of the reaction. For example, when cupric fluoride is used as a catalyst in the fluorination of ethane with hydrogen fluoride and hydrogen bromide at 325 to 575° C., ethyl fluoride is obtained in the lower temperature range and vinyl fluoride in the higher temperature range. With this catalyst the most suitable temperature for the preparation of vinyl fluoride is 450 to 550° C. When iron oxide is used in place of cupric fluoride, vinyl fluoride is obtained at both the lower and higher temperatures, the most suitable temperatures being from 400 to 550° C. On the other hand, the use of lead oxide as catalyst favors the formation of ethyl fluoride over the entire range (325 to 575° C.). In order to convert ethane to fluorinated hydrocarbons containing two carbon atoms temperatures above 575° C. should be avoided.

The reaction must, of course, be carried out in equipment that is resistant to hydrogen fluoride. As indicated in the examples, Inconel metal is suitable for this purpose. Monel metal, stainless steel, and nickel can also be used.

The fluorohydrocarbons obtained are useful in the same applications for which fluorohydrocarbons made by other methods are used, e. g., refrigerants, heat transfer agents, and intermediates for the preparation of other products. Thus, vinyl fluoride is useful in the preparation of vinyl fluoride polymers and copolymers.

As many apparently widely different embodiments of this invention may be made without departing from the spirit and scope thereof, it is to be understood that this invention is not limited to the specific embodiments thereof except as defined in the appended claims.

I claim:

1. A process for preparing fluorinated hydrocarbons which comprises heating, in contact with a catalyst to reaction temperature within the range of 325° to 700° C., a mixture of a paraffin hydrocarbon, hydrogen fluoride, and oxygen, said catalyst being selected from the group consisting of inorganic salts and oxides of a variable valent metal.

2. The process set forth in claim 1 in which said paraffin hydrocarbon contains from 1 to 5 carbon atoms.

3. The process set forth in claim 1 in which said paraffin hydrocarbon is ethane.

4. A process for preparing fluorinated hydrocarbons which comprises heating, in contact with a catalyst and a promoter to reaction temperature within the range of 325° C. to 700° C., a gaseous mixture of a paraffin hydrocarbon having from 1 to 5 carbon atoms, hydrogen fluoride, and oxygen, said catalyst being selected from the group consisting of inorganic salts and oxides of a variable valent metal, said promoter being a hydrogen halide which is a member of the group consisting of hydrogen chloride, hydrogen bromide and hydrogen iodide.

5. The process set forth in claim 4 in which said promoter is hydrogen bromide.

6. The process set forth in claim 4 in which the oxygen is contained in said mixture in an oxygen to paraffin mole ratio of from 1:3 to 3:1 and in an oxygen to hydrogen fluoride ratio of from 1:5 to 2:1.

7. The process set forth in claim 4 in which said paraffin hydrocarbon is ethane.

8. A process for preparing fluorinated hydrocarbons which comprises heating, in contact with a catalyst and hydrogen bromide as a promoter to reaction temperature within the range of 458° C. to 575° C., a gaseous mixture of ethane, hydrogen fluoride, and oxygen, wherein said oxygen is present in an oxygen to ethane mole ratio of from 1:3 to 3:1 and in an oxygen to hydrogen fluoride ratio of from 1:5 to 2:1, said catalyst being selected from the group consisting of inorganic salts and oxides of a variable valent metal.

GERALD M. WHITMAN.

REFERENCES CITED

The following references are of record in the file of this patent:

UNITED STATES PATENTS

| Number | Name | Date |
|---|---|---|
| 1,654,821 | Krause et al. | Jan. 3, 1928 |

Certificate of Correction

December 18, 1951

Patent No. 2,578,913

GERALD M. WHITMAN

It is hereby certified that error appears in the printed specification of the above numbered patent requiring correction as follows:

Column 4, line 33, for "Example VIII" read *Example VII*; column 6, line 56, for "458°" read *450°*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*

Certificate of Correction

Patent No. 2,578,913 December 18, 1951

GERALD M. WHITMAN

It is hereby certified that error appears in the printed specification of the above numbered patent requiring correction as follows:

Column 4, line 33, for "Example VIII" read *Example VII*; column 6, line 56, for "458°" read *450°*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*